United States Patent [19]

Budd et al.

[11] Patent Number: 4,653,088
[45] Date of Patent: Mar. 24, 1987

[54] TELEPHONE CIRCUITRY WITH POWER BACKUP

[75] Inventors: Stephen C. Budd, Hudson, N.H.; Richard Gaughan, North Chelmsford, Mass.

[73] Assignee: Wang Laboratories, Inc., Lowell, Mass.

[21] Appl. No.: 715,421

[22] Filed: Mar. 25, 1985

[51] Int. Cl.[4] .................................... H04M 19/08
[52] U.S. Cl. .................................. 379/165; 379/413
[58] Field of Search ............. 179/99 R, 99 LC, 99 A, 179/276, 18 AD, 2 BC, 70, 77, 81 R

[56] References Cited

U.S. PATENT DOCUMENTS 4,503,291  3/1985  von Holten et al. ......... 179/90 B X

Primary Examiner—James L. Dwyer
Attorney, Agent, or Firm—Michael H. Shanahan; Gregory P. Gadson

[57] ABSTRACT

CPU based telephone circuitry allowing for enhanced telephone functions includes a battery backup. To minimize power drain from the battery, the battery only supplies limited circuitry required for limited telephone service without CPU support. To further limit power drain, power backup circuitry includes a first circuit limited to sensing of the hookswitch status and sensing of incoming calls and generation of a ringing sound. Based on the status of the hookswitch, additional amplifiers, dialers and the like required for the limited telephone service are then powered by the backup battery.

16 Claims, 3 Drawing Figures

TELEPHONE CIRCUITRY WITH POWER BACKUP

FIELD OF THE INVENTION

The present invention relates to telephones and in particular to telephone sets which include electronic circuitry powered from line current not taken from the telephone network.

BACKGROUND

Telephones have typically received the small amount of power required for their operation directly from the telephone lines. With such telephone sets, the telephone may be operable even though the primary line power to an establishment is interrupted.

More recently, microprocessor based electronics have been included in telephone sets to provide for telephone functions which are based on digital processing. For example, a central processing unit (CPU) based on a microprocessor may provide for automatic dialing from a directory of electronically stored numbers or from temporary storage of the last number dialed by the telephone set. Where the telephone set is to be used for transmitting both voice and digital data signals, the CPU may control routing of the signals to and from speakers and microphones and to and from digital processing circuitry. Where the telephone set services two or more telephone lines, the CPU may control selection of a single line or of both lines for conference calls.

The power available on the telephone line is insufficient for the digital processing circuitry of the more sophisticated telephone sets. Thus, the electronics rely on the normal local power. To prevent noise on the phone line from the power line, the circuits powered by the phone line and local power line must be isolated from each other through transformers, optical couplers and the like. The isolation is most effective and simplest when made at or close to the incoming telephone lines. As a result, substantially all of the telephone circuit is powered by the local power line. A disadvantage of such systems is that the telephone set becomes dependent on both telephone lines and power lines for operation. Simpler telephones may be operable with interruptions in power, but the sophisticated electronic telephones become inoperable.

SUMMARY OF THE INVENTION

Telephone signal processing and handling circuitry, including a CPU powered from a local power supply, is provided with a backup power supply battery. With power failure, the battery only supplies power to a limited portion of the overall circuitry to provide limited telephone service which is not dependent on the CPU. As a result, the system may have a much smaller backup supply than would be required by the CPU.

To further lessen the drain on the battery two circuits are separately powered by the battery. The first circuit is connected to the battery when local power is interrupted. That circuit permits recognition of incoming calls and initiation of outgoing calls. A second, more extensive circuit is only powered when a call is to be completed to or from the telephone circuitry.

Preferably, the first circuit includes only limited circuitry for sensing the status of the hook switch and circuitry responsive to signals on the telephone line to generate a ringing sound to indicate an incoming call. The second circuit may be powered in response to the hookswitch. That second circuit may include a dialer and signal amplifiers which allow for adequate but limited telephone service.

In normal operation of the telephone under full power, the CPU may respond to the hookswitch to close the tip and ring lines. However, when the system is operating in a power backup mode the hookswitch controls closing of the tip and ring lines directly. Similarly, the ring generator may respond to the CPU with full power but respond directly to an incoming signal in the power backup mode of operation.

The telephone circuitry may include a number of switches for controlling such options as which of two telephone lines should be utilized, whether transmission is of voice or data signals, whether the handset or speaker phone is used and whether the dialing is to be pulse dial or dial tone multifrequency (DTMF). With full power, those switches may be controlled by the CPU. With power backup a default logic circuit responding to failure of the CPU may set the switches to limit the telephone service to, for example, a single line voice transmission, the telephone handset, and either pulse or DTMF dialing. The backup circuit may be disabled by a switch, but the status of that switch is indicated to the CPU during normal power conditions.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

The three sheets of drawings.

DESCRIPTION OF A PREFERRED EMBODIMENT

Figure 1:
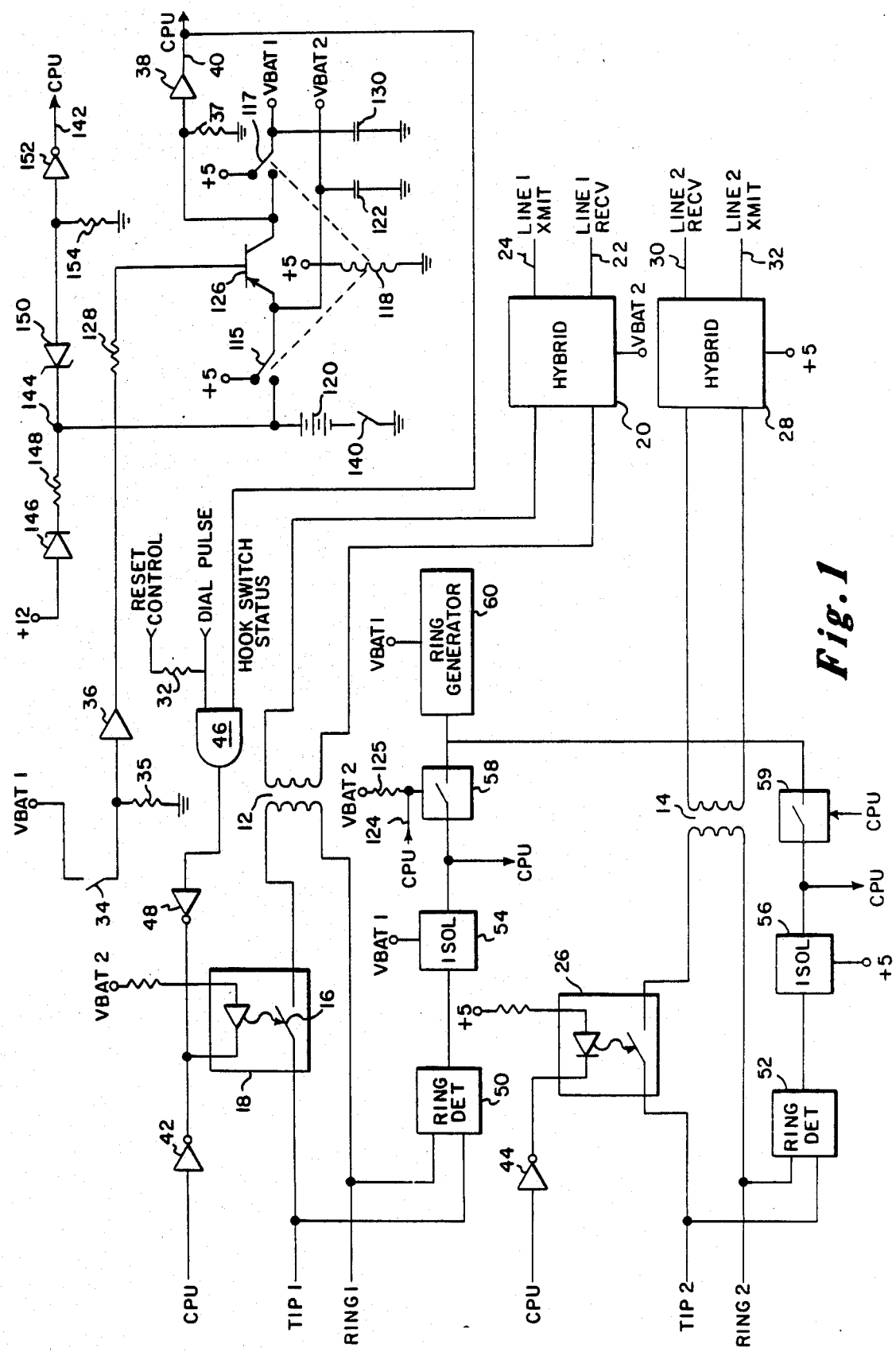
FIGS. 1-3, are an electrical schematic diagram of a telephone circuit embodying the present invention.
Figure 2:
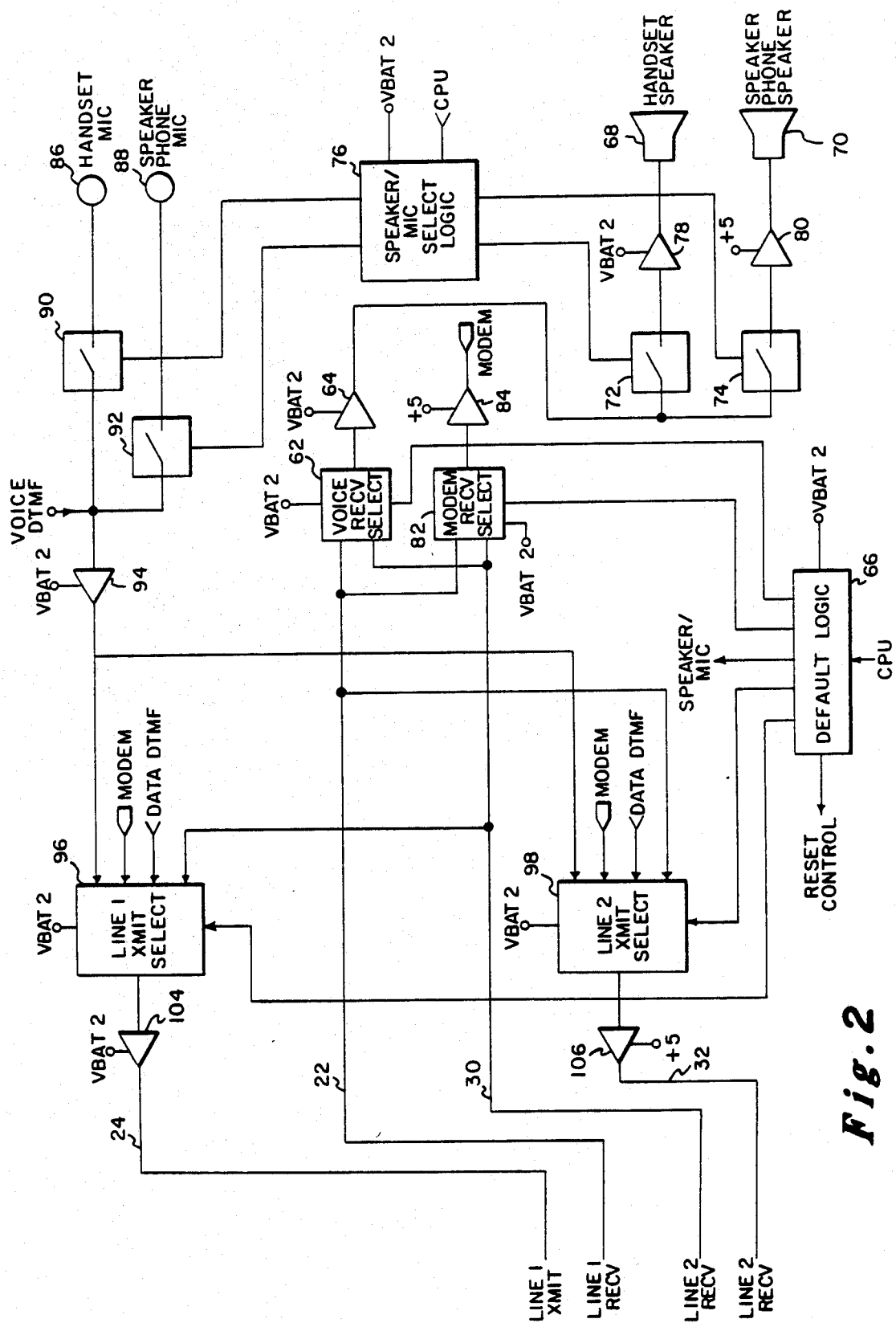
Figure 3:
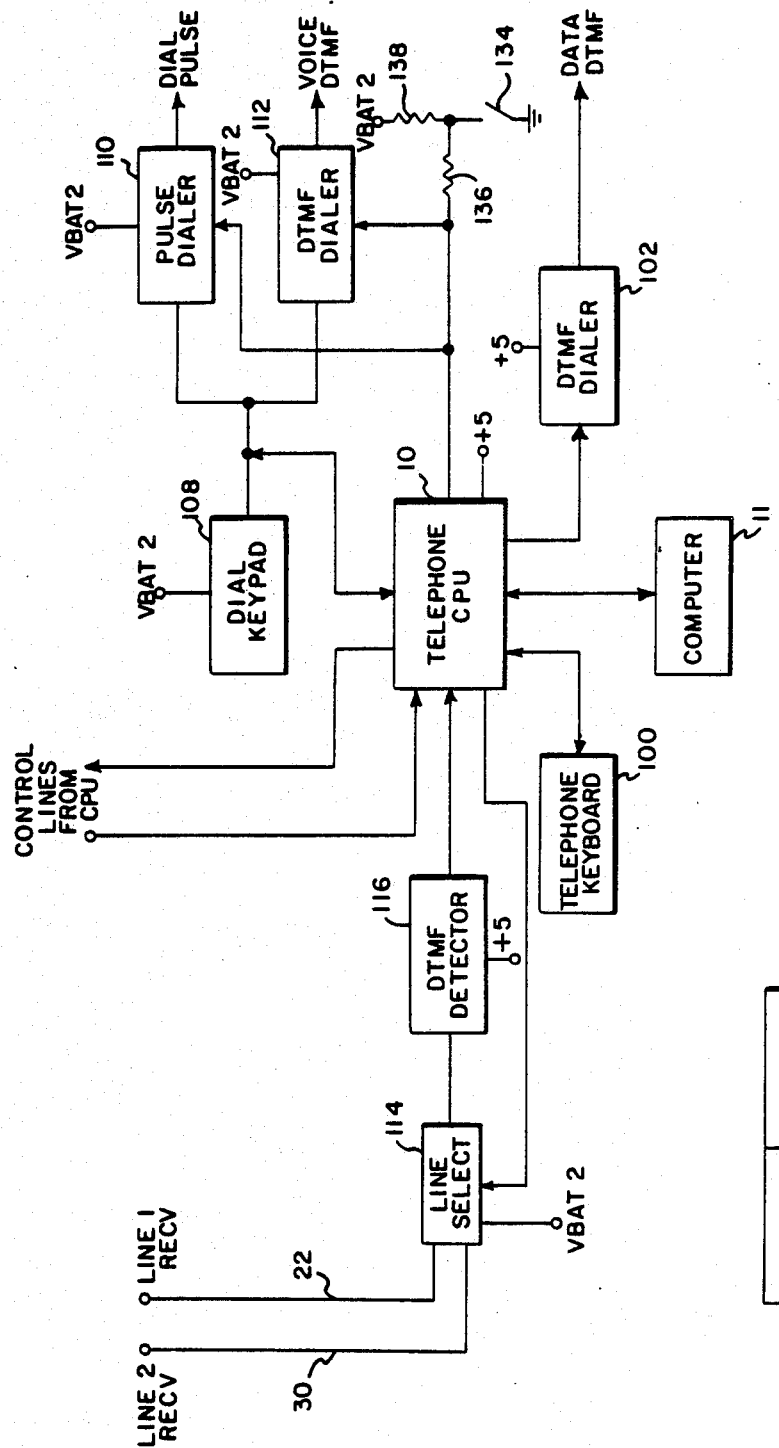

The signal processing and handling circuitry of a telephone set embodying the present invention is illustrated in the three sheets of drawings. As shown in sheet 3, the circuitry includes a CPU 10 which is preferably microprocessor based. The telephone set may be integrated with a computer 11.

As shown in sheet 1, the system includes two telephone lines, each including a tip wire and a ring wire leading to an isolation transformer 12 or 14. When a call is being made on the first line, for example, a switch 16 of a semiconductor relay 18 is closed to connect the tip and ring wires across the transformer 12. Received signals are directed by a hybrid circuit 20 to a receive signal line 22. Signals transmitted from line 24 are converted to a tip/ring signal by the hybrid circuit 20 and passed through the transformer 12 to the telephone network. Similarly, signals on line 2 may be transmitted and received when the semiconductor relay 26 closes the tip and ring circuit, and a hybrid circuit 28 converts the tip/ring signals to four-line signals on lines 30 and 32 relative to ground.

For ordinary voice commmunications with full power, a call can be initiated by lifting the telephone handset which opens a hookswitch 34. With the voltage VBAT1 no longer applied across resistor 35, the input to a buffer 36 goes from high to low. That low signal is applied through the buffer 36 and a resistor 128 to turn on a transistor 126. A +5 voltage is then applied through a switch 115 and across a resistor 37 to provide a high signal to a buffer 38. That high signal is passed to the CPU 10 on a line 40. The CPU then responds to a line selection button on the telephony keyboard 100 or some other source to select either line 1 or line 2. Depending on the line or lines selected, a signal is passed through inverter 42 for line 1, inverter 44 for line 2, or both inverters. A high input to inverter 42 closes the switch 16 to connect line 1. Similarly, a high input to inverter 44 closes the switch of the relay 26 to make line 2 operable. During normal operation, the RESET CONTROL input to the AND gate 46 is low. Thus the inverter 48 has a high impedance output to render control of the switch 18 to the CPU through the inverter 42.

In typical full power operation, a call to the telephone set is detected by one of the ring detectors 50 and 52 which are powered by their respective telephone lines. When a signal is received on either line, the CPU is notified through isolation circuit 54 or 56. Semiconductor switches 58 and 59 associated with lines 1 and 2 are normally open. The CPU responds to a signal on either of the lines to close the respective switch 58 or 59 and initiate a ringing sound through a ring generator 60. Control of the ring generator 60 is through the CPU in order to prevent ringing with data transmission that does not require user response in an autoanswer mode of operation. Again, when a user responds to a ringing sound by picking up the handset, the hook switch 34 is opened and the CPU is notified by way of line 40. The CPU then closes the switch of one of the relays 18 and 26 to initiate communications.

Voice signals which are received on either of the lines 22 and 30 are directed through a line selector 62 (sheet 2) which comprises two analog switches. One or both of the received signals are passed through the select circuit 62 to a voice amplifier 64 depending on control signals received from a logic circuit 66 which responds to a control input from the CPU. The amplified voice signals are then directed to either the handset speaker 68 or the speaker phone speaker 70. Again, the signals are directed by analog switches 72 and 74 which respond to select logic 76. This select logic responds directly to the CPU. Depending on which of the switches 72, 74 is closed, the received voice signals are amplified in an amplifier 78 or 80. The amplified signal is applied to a handset speaker 68 or a speaker phone speaker 70.

When data is to be received by the system, the logic 66 closes one of two analog switches in a select circuit 82 to direct the incoming data through an amplifier 84 to a modem.

Voice signals to be transmitted over one or both of the telephone lines originate from either a handset microphone 86 or a speaker phone microphone 88. The signal from one of those microphones is passed through an analog switch 90 or 92 selected by the speaker/mic select logic 76. The selected signal is passed through an amplifier 94.

In order to allow for selection of either voice or data inputs or a combination of voice inputs to either telephone line, select circuits 96 and 98 are provided. Each select circuit is a bank of analog switches controlled by signals from the logic 66. For voice transmission, the select circuit 96 may select the output of amplifier 94 alone or, for conference calls, the output of amplifier 94 as well as the signal received on line 30. For data transmission, the selector may select a signal from a modem or a data DTMF signal originating from a DTMF dialer 102. The dialer 102 is used for dialing prior to data transmission through the modem and may also be used to transmit DTMF data prior to coupling of the modem.

A signal selected by a select circuit 96 or 98 is amplified by an amplifier 104 or 106 and directed through the hybrid 20 or 28 to the first or second telephone line. The switches 62, 82, 96 and 98 together allow for simultaneous data and voice communications on separate lines or voice conference calls using both lines.

Just as the CPU may transmit DTMF data through a DTMF dialer 102, it may receive DTMF data from either of the receive lines 22 and 30 through a line select circuit 114 and a DTMF detector 116.

A number to be dialed may be indicated by keys on a dial key pad 108 (sheet 3) or by the CPU 10 in automatic dialing. The numbers may be converted to DTMF signals by a DTMF dialer 112 depending on a control signal from the CPU or a default condition set by a switch 134. The DTMF dialing signals are applied to the input of amplifier 94 (sheet 2) of the voice signal circuit and may thus be directed to either line. Alternatively, dial pulses may be applied by the CPU through inverters 42 and 44 (sheet 1) to open and close the switches of the semiconductor relays 18 and 26.

From the above description of full power operation of the telephone circuit, it can be recognized that the CPU 10 plays a key role in selecting modes of circuit operation. The CPU may make the selections in response to function keys pressed on a telephony keyboard 100 positioned near to the conventional dial key pad 108. The keyboard 100 may include line keys to allow for selection of one or both of lines 1 and 2, a hold key for placing a line on hold, a mute key for opening both switches 90 and 92, a speaker phone key and an autodial key. Any number of other conventional telephone functions may be included. Further, the CPU monitors the output of the dial key pad for automatic redialing and may store a list of automatic dialing numbers.

The circuit includes a battery 120 as a backup power supply. During full power operation of the system, that battery is charged from a +12 volt supply through a diode 146 and resistor 148.

The system further includes a vacation switch 140 (sheet 1) which allows the battery backup to be disconnected when the system is not to be used for a period of time and local power may be disconnected. The status of that switch is indicated to the CPU during normal full power operations on line 142. When the switch 140 is open, the voltage at node 144 goes to approximately 12 volts through diode 146 and resistor 148. That 12 volts is sufficient to cause conduction through the zener diode 150 to provide a high input to inverter 152 across resistor 154 and a low signal to the CPU on line 142. On the other hand, when switch 140 is closed the voltage at node 144 is set by the battery 120 at approximately 5 volts. That voltage level is insufficient to cause conduction across the zener diode 150 and the input of inverter 152 is grounded. As a result, a high signal is applied to line 142.

Thus far, the circuit has been described with respect to full power operation. Operation of the system when power is interrupted will now be described with particular reference to the circuit at the upper right of sheet 1.

The circuitry of the overall system generally operates on a regulated +5 volt supply. The circuitry is divided into three sets of circuits. One set is powered directly from a regulated line voltage. The other two sets are powered by VBAT 1 and VBAT 2 indicated as outputs of the circuit in the upper right of sheet 1. During full power operation of the system, the switches 115 and 117 are set as illustrated to the regulated +5 volt supply. Thus, the entire system operates from the regulated +5 volts. With interruption of local power, however, the regulated supply drops to zero and that drop in voltage is sensed by relay 118 of which the switches 115 and 117 are a part. Each switch is thus moved to the position away from the regulated supply.

With power interruption, the battery 120 is initially connected through the switch 114 directly to the VBAT 1 output across a capacitor 122. It can be seen from examination of the overall system that the VBAT 1 supply is applied across resistor 35 and the hook switch 34. It is also applied to the ring generating circuit including the isolation circuit 54 and the ring generator 60. The ring detector 50, is connected to the tip and ring wires of line 1 ahead of the isolation circuit 54 and is powered directly from the telephone line. Thus, with interruption of local power the circuit for detecting an incoming signal and for generating a ringing sound is immediately powered by the battery 120 if the vacation switch 140 is closed. Further, when the CPU fails, the input 124 at resistor 125 goes to a high impedance state which results in the switch 58 being closed. Thus, the ring generator is controlled directly from the ring detector. The CPU, which generally detects the incoming signal from the isolation circuit 54 and then controls the ring generator 60, is bypassed by the switch 58.

With VBAT 1 applied across the hookswitch 34 and the resistor 35 the status of the hookswitch can be monitored even with line power interruption. When the hookswitch 34 is opened the output of buffer 36 goes low to apply a low input to the PNP transistor 126 through the resistor 128. The transistor 126 thus turns on to conduct from the battery 120 through the switches 115 and 117 to the VBAT 2 output across capacitor 130. Thus, both VBAT 1 and VBAT 2 are then powered by the battery 120 and an additional set of circuits is enabled.

The VBAT 2 power supply is applied to the circuits required for elementary voice communications through line 1 but does not power nonessential circuit elements such as the CPU and the circuits dedicated to line 2, data transmission, and speaker phone operation. Because the CPU is not operable during power failure, a default system is provided to allow for control of system elements which would typically be controlled by the CPU. One such default condition is the closing of switch 58 when the input to that switch from the CPU goes to a high impedance state.

Other default conditions are determined by the default logic 66 or by a default condition of the speaker/mic select logic 76. During full power operation of the system, the default logic may pass certain CPU control signals directly to various switches within the system including the transmit select circuits 96 and 98 and the receive select circuits 62 and 82. However, when the CPU outputs go to a high impedance state, the logic 66 goes to a default state to limit the system to voice communication with the handset and line 1 only. Thus, of the select circuits 96 and 98, only the switch connecting voice amplifier 94 with the line 1 amplifier 104 is closed. Of the receive select circuit 62 and 82 only the switch which connects line 22 to the receive amplifer 64 is closed. The speaker/mic select logic closes switches 90 and 72 but opens switches 92 and 74.

Further, only those amplifiers and the like which are required for voice communication on line 1 are powered by VBAT 2. Specifically, the hybrid circuit 20 is powered by VBAT 2 but hybrid circuit 28 is only powered by the regulated 5 volt supply. Amplifiers 64, 78, 94, and 104 are powered by VBAT 2 but amplifiers 80, 84, and 106 are only powered by the regulated 5 volt supply. The dialing circuitry including the keypad 108 and the dialers 110 and 112 are also powered by VBAT 2. The circuits required for data transmission including the dialer 102 and the DTMF detector 116 are only powered by the regulated supply.

Another default condition results in a high reset control applied to resistor 32 (sheet 1) from the default logic 66. As a result of that high input the AND gate 46 becomes responsive to the hookswitch directly through buffers 36 and 38. In the on hook condition with hookswitch 34 closed, the output of buffer 38 is low so that the output of the AND gate 46 is low, and the output of inverter 48 is high and switch 16 remains open. When the hookswitch 34 is opened with removal of the handset, the output of buffer 38 goes high so that the output of inverter 48 goes low to close the switch 16. Thus, it can be seen that full power control of the relay 18 is through the CPU by way of line 40 and inverter 42, but with power failure control of the relay 18 is directly through the hookswitch status line 40, AND gate 46 and inverter 48.

A further default condition is established by the switch 134 (sheet 3). This switch is set by the user to select either the pulse dialer 110 or the DTMF dialer 112 in the interrupted power mode of operation. During full power operation, though the CPU can monitor and respond to the switch position, the dialer selection is made by the CPU with the enable lines to the dialers isolated from the switch 134 by a resistor 136. However, with interrupted power the CPU control line goes to a high impedance state to allow switch 134 to access the dialers 110 and 112 directly. With VBAT 2 applied across the resistor 138 and the switch 134 the enable inputs to the dialers become dependent on the position of switch 134.

If the DTMF dialer is selected, it operates during power failure in the same manner that it operates under full power conditions by applying a voice DTMF signal to the input of amplifier 94. Pulse dialing, on the other hand, is by a different mechanism during power failure. As previously described, during full power operation the CPU controls pulse dialing through the inverter 42 (sheet 1). With the CPU disabled during power failure, a pulse dialer circuit 110 must be provided. The DIAL PULSE signal from the circuit 110 is applied to the AND gate 46. During power backup operations, a high signal is normally applied from the reset control through the resistor 32. For pulse dialing, the pulse dialer circuit 110 pulls the input to the AND gate 46 low for each pulse. As a result, the output of invertor 48 goes high to open the switch 16 with each pulse.

It has been determined that the system described above not only allows for the initiation of calls to and from the telephone during power failure, but also allows for uninterrupted conversations on line 1 as the system switches from full power operation to power backup and back to full power. The result is obtained by the use of electronic switches rather than electromechanical relays and low power components which are not so susceptible to transients on the power line.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. Telephone control circuitry of the type including an electronic central processing unit (CPU) powered from a local power supply isolated from the telephone network, the telephone circuitry comprising:
   a battery power supply; and
   means for connecting the battery power supply to a limited circuit of the telephone circuitry when local power is interrupted, that limited circuit excluding the CPU but allowing for limited telephone service over a telephone line.

2. Telephone control circuitry of the type including an electronic central processing unit (CPU) powered from a local power supply isolated from the telephone network, the telephone circuitry comprising:
   a battery power supply;
   first means for connecting the battery power supply to a first limited circuit of the telephone circuitry when the line power is interrupted to permit recognition of incoming calls and initiation of outgoing calls; and
   second means for connecting the battery power supply to a second limited circuit of the telephone circuitry when the line power is interrupted and when a call is to be completed to or from the telephone circuitry, the first and second limited circuits excluding the CPU but allowing for limited telephone service.

3. Telephone circuitry as claimed in claim 2 wherein the first limited circuit includes means for sensing the status of a telephone set hookswitch and a circuit for sensing an incoming call and for generating a ringing sound.

4. Telephone circuitry as claimed in claim 3 wherein the first means comprises a relay for sensing local power and switching the first limited circuit from a primary power supply to the battery power supply.

5. Telephone circuitry as claimed in claim 3 wherein the second means comprises a switch responsive to the means for sensing the hookswitch status.

6. Telephone circuitry as claimed in claim 3 wherein the second circuit comprises a dialer and signal amplifiers.

7. Telephone circuitry as claimed in claim 3 further comprising a switch for connecting corresponding tip wires of a telephone line and for connecting corresponding ring wires of the telephone line, the switch being responsive to the CPU in full power operation but being responsive directly to the status of the hookswitch when the battery power supply is connected.

8. Telephone circuitry as claimed in claim 3 wherein a ring generator is responsive to the CPU during full power operation but is responsive directly to an incoming signal on the telephone line when the battery power supply is connected.

9. Telephone circuitry as claimed in claim 2 wherein:
   the first limited circuit includes means for sensing the status of a telephone hookswitch and a circuit for sensing an incoming call and for generating a ringing sound;
   the second means comprises a switch responsive to the means for sensing the hookswitch status; and
   the second circuit comprises a dialer and signal amplifiers.

10. Telephone circuitry as claimed in claim 9 for transmitting and receiving signals on two telephone lines wherein the first and second circuits permits transmission and reception of signals only on one of those lines when the circuits are connected to the battery power supply.

11. Telephone circuitry as claimed in claim 9 including circuitry for transmission and reception of signals relative to either a handset or a speaker phone and in which the first and second circuits permit use of only the handset when the circuits are connected to the battery power supply.

12. Telephone circuitry as claimed in claim 9 further comprising a switch for disconnecting the battery power supply and means for sensing the status of that switch and for providing an indication of that status to the CPU.

13. Telephone circuitry as claimed in claim 9 further comprising a pulse dialer and a DTMF dialer selected by the CPU and a switch for selecting either the pulse dialer or the DTMF dialer when line power is interrupted.

14. Telephone circuitry as claimed in claim 9 wherein the first and second limited circuits include select circuits for selecting alternative modes of telephone operation with full local power and default logic circuitry for selecting limited voice communication signal processing and handling when local power is interrupted.

15. Telephone circuitry as claimed in claim 9 further comprising a switch for connecting tip and ring wires of a telephone line, the switch being responsive to the CPU in full power operation but being responsive directly to the status of the hookswitch and when the battery power supply is connected.

16. Telephone circuitry as claimed in claim 9 wherein a ring generator is responsive to the CPU during full power operation but is responsive directly to an incoming signal on the telephone line when the battery power supply is connected.

* * * * *